Dec. 6, 1955  J. D. SKELTON  2,726,131
MODULATED GALVANOMETER RECORDING OF TRANSIENT SIGNALS
Filed Dec. 18, 1952  2 Sheets-Sheet 1

Jesse D. Skelton Inventor
By W. O. T. Heilman Attorney

United States Patent Office 2,726,131
Patented Dec. 6, 1955

2,726,131

MODULATED GALVANOMETER RECORDING OF TRANSIENT SIGNALS

Jesse D. Skelton, Tulsa, Okla., assignor to Esso Research and Engineering Company, a corporation of Delaware Application December 18, 1952, Serial No. 326,760

3 Claims. (Cl. 346—109)

This invention relates to a novel method and apparatus for making photographic records of electrical transient signals. More especially the invention concerns the recording of such signals in the form of photographic records in which the density of the recording varies in proportion to the signal. This invention is of particular use in the making of seismic records in geophysical exploration.

One method of geophysical exploration that has been in use for some time is that known as seismic prospecting. Briefly this method consists in initiating a seismic disturbance at a selected point on or adjacent the earth's surface and detecting reflected seismic waves at a plurality of points spread out in a selected pattern on the earth's surface. The seismic waves are detected with sensitive instruments known as seismometers or geophones which translate the detected motion into electrical impulses which are then fed to suitable amplifiers and recorded on a seismograph. By simultaneously providing the seismic record with suitable timing marks it is possible to determine from the record the length of time required for the arrival of seismic waves at each of the detection points either directly from the seismic source or by reflection from underlying geological strata. From these arrival times and from other data pertinent to the area being studied, such as seismic wave velocities in the various earth layers, it is then possible to calculate the depths of the various reflecting substrata.

Oscillograph records of detected seismic waves obtained as just described when made in favorable areas may often be examined visually to pick out prominent reflections which will show up as similar transients that line up on the adjacent traces of the record. However, in many instances such reflections are difficult to distinguish because of the complexity of the wave forms. It has more recently been noted that if the detected impulses are recorded in the form of variable density photographic records many more reflections can often be noted. Suitable means for making such variable density records are described, for example, in U. S. Patent 2,051,153 of Frank Rieber.

When recording transients in the form of variable density photographic records, it has been the usual practice to employ an incandescent lamp that varies in brightness in relation to the voltage fed to it. For best results the lamps must be carefully selected for their response characteristics. Furthermore, as disclosed in the aforementioned Rieber patent, the lamps must be small when they are used for seismic recording in view of the necessity for close spacing when recording a number of tracks or channels on a single film. There are a number of disadvantages associated with the use of such lamps. For example, since the lamps have a thermal lag the photographic record tends to be distorted somewhat and a complicated electric circuit is needed to overcome this. Furthermore, when using the required electrical set-up to overcome lamp distortion a 100% modulation in the voltage fed to the equipment results in only 5% modulation in the light from the lamps. It is therefore necessary that the recording film have high contrast. This in turn leads to considerable photographic distortion, which is a disadvantage, particularly if the variable density record is to be played back for reproduction in another form.

One object of the present invention is to provide a method and apparatus for recording electrical transient signals in the form of variable density photographic records without requiring the use of a modulated light source. Another object of the invention is to provide a method and means whereby conventional seismograph galvanometers can be modified to record signals in the form of variable density records.

In accordance with this invention the signal to be recorded is employed to modulate the amplitude of a high frequency carrier signal and the modulated carrier signal is applied to a recording galvanometer. An apertured barrier is placed between the galvanometer mirror and the photographic recording surface to block out all but the central portion of the light beam traveling from the mirror to the recording medium, so that a variable density record is produced, as will become clear from the ensuing description.

The nature and objects of the invention and the manner in which the invention may be used will be more fully understood when reference is made to the accompanying drawings in which.

Figure 1:
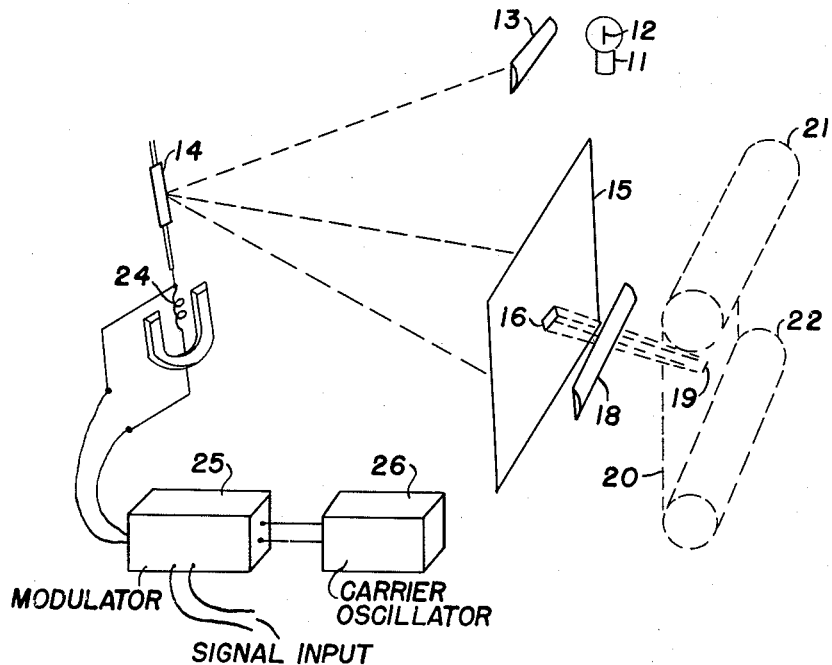
Figure 1 is a schematic diagram of an arrangement of light source, galvanometer, signal modulating means, light barrier and recording medium that may be used in carrying out the method of this invention.

Referring particularly to Figure 1 a light source 11 is provided which is simply a lamp having a vertical line filament 12 which sends a vertical line of light through a cylindrical lens 13 to be reflected from a galvanometer mirror 14 onto a light barrier 15. Lamp 11 may be a conventional oscillograph lamp. Lens 13 is not essential to the system, although it does enable more efficient use of the light source. The center of barrier 15 is provided with a rectangular aperture 16 which allows a portion of the reflected light beam to pass through a cylindrical lens 18 which focuses the beam into a line image 19 on the photographic medium 20. The latter may be carried by a pair of rollers 21 and 22 which feed the recording medium past the image focus point at a predetermined speed. Alternatively, the recording medium 20 could be mounted on a drum much in the manner disclosed in the aforementioned Rieber patent.

Galvanometer mirror 14 is of the type used in conventional seismograph recorders and rotates on its vertical axis in response to voltages fed to the galvanometer. The coil 24 of the galvanometer is driven by a high frequency oscillator 26, the amplitude of the oscillations being modulated by suitable modulating means 25 in proportion to the signal to be recorded, which is fed into the modulator 25. It is preferred that the galvanometer be one having a high natural frequency which preferably should be about the same as the carrier frequency. The carrier frequency supplied by the oscillator should preferably be of the order of ten times the maximum frequency of the signal being recorded, which for seismic work will be about 100 cycles per second. Thus it is preferred for seismic work that the frequency supplied by the oscillator 26 be in the range of 700 to 1500 cycles per second. Preferably the frequency should be about 1000 cycles per second.

It is not necessary to describe the circuits making up the modulator 25 and the oscillator 26. Constant frequency oscillators are well known and the modulator can be any one of the known conventional electronic amplitude modulators.

Figure 2:
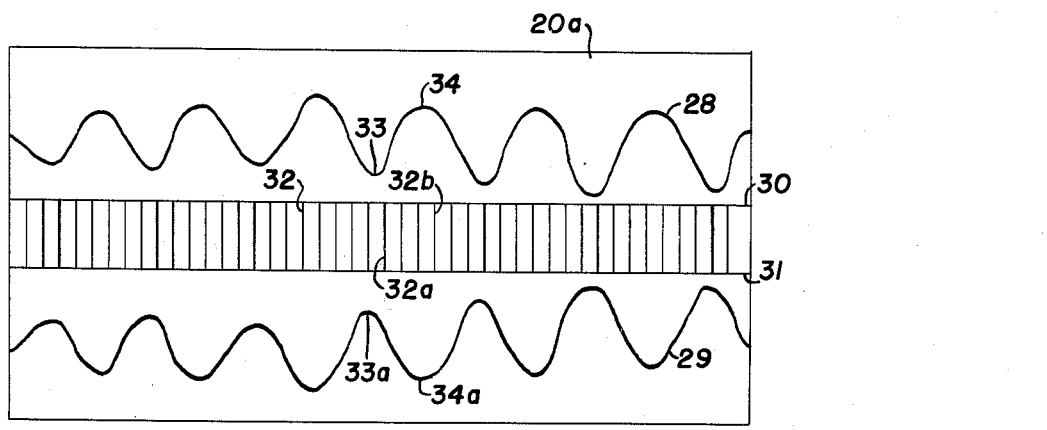
Figure 2 is a diagrammatic illustration of the function of the light barrier and aperture.

The manner in which the arrangement of Figure 1 operates to produce a variable density record will be readily understood when reference is made to Figure 2. Since the galvanometer trace sweeps back and forth across the barrier at a constant rate, which is the carrier frequency rate, and since the intensity of the light comprising the galvanometer trace is constant, it is apparent that the exposure of the trace is directly proportional to the distance it must travel in making the individual sweeps. If the barrier 15 were removed and the entire sweep of the image recorded on the photographic medium 20a the image would cover the area defined by the lines of maximum sweep 28 and 29. However, the amount of trace that is actually recorded falls between the lines 30 and 31, these lines defining the width of the beam that reaches medium 20 through the aperture 16. Since each trace involves the same amount of travel time it follows that the trace will move more slowly from point 33 to point 33a than from point 34 to point 34a, for example. Hence the former trace will travel more slowly across the record medium in the region indicated by line 32a than it will in the region indicated by line 32b. It therefore follows that line 32a will be more dense than line 32b.

The lines 32 are evenly spaced along the trace since the speed of travel of the recording medium is constant and the frequency of oscillation of the beam is also constant. It is of course to be understood that the spacing of the lines 32 in Figure 2 is greatly exaggerated for illustrative purposes.

It is preferred that the width of the aperture 16 be small in relation to the total sweep of the modulated light beam. Thus if the total travel of the beam across the light barrier 15 is say about 1 inch, the aperture 15 should have a width of about 0.05 inch. The aperture will of course be positioned in a middle portion of the area covered by the sweep of the light beam, as indicated in Figure 2.

For proper operation of the apparatus it is important that the linear speed of travel of the recording medium 20 be proportional to the oscillation frequency of the galvanometer mirror. Thus for an oscillating frequency of 1000 cycles per second the film speed should be in the range of 4 to 8 inches per second.

It should be noted that although the preferred arrangement requires the use of cylindrical lens 18 to focus the light transmitted through the aperture into a line image, with light of sufficient intensity and with film of sufficient sensitivity the height of aperture 16 could be the same as the width of the image 19, thus eliminating the need for lens 18. In this event film 20 would be placed close to the barrier 15. As a practical matter, however, lens 18 will usually be necessary for best results.

Figure 3:
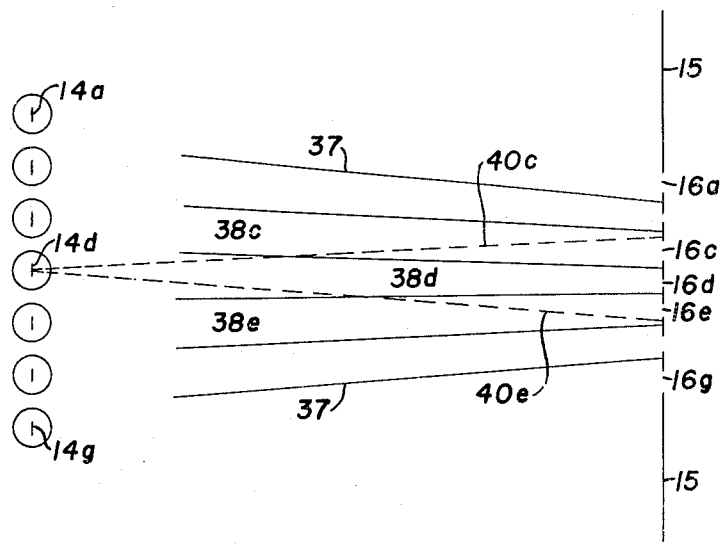
Figure 3 is a diagram of a channel shield arrangement for multiple channel recording using this invention.

One of the advantages of the recording system of this invention is that it is readily adapted to multiple channel recording. A channel shield arrangement for this purpose is shown in Figure 3. An array of galvanometers 14 is provided much in the same manner as in conventional seismograph recording and a separate aperture 16a, etc. is provided in barrier 15 to correspond to each of the galvanometer mirrors 14a, etc. To prevent the reflected image from any of the mirrors from reaching an aperture other than its own aperture a plurality of light channel shields 37 are provided. The length of these channels must be sufficient to prevent the extreme edges of the beam from entering an adjacent channel. Thus the shields 37 defining channel 38d must be of sufficient length to prevent light from mirror 14d from reaching channels 38c and 38e within the area defined by dotted ray paths 40c and 40e, which lead to the extreme left edge of aperture 16c and the extreme right edge of aperture 16e. Shields 37 are constructed of black non-light-reflecting material so that any light from mirror 14d falling into channels 38c and 38e outside the defined area will not reach aperture 16c or 16e or any aperture other than aperture 16d. To ensure that the surfaces of shields 37 will not reflect random light through the apertures it is preferred that the surfaces of the shields be roughened to some extent, as for example by coating them with a black crackle finish enamel. Light source 11 and lens 13 will not be in the same plane as the mirrors and light channels but will be positioned either above them, as shown in Figure 1, or below them.

With the multiple channel recording system of Figure 3 the circuit arrangement for each of the galvanometers will be similar to that of Figure 1. While a separate modulator 25 will be needed for each galvanometer it will only be necessary to supply a single oscillator 26, as this oscillator can feed each of the modulators.

In many instances it may be possible to insert a channel shield assembly of the type shown in Figure 3 in a conventional seismograph camera and thus convert it to the system of this invention.

It is not intended that this invention be limited by the specific embodiments described, which have been presented by way of example only. The scope of the invention is defined in the following claims.

What is claimed is:

1. An optical system for making an optical record of an electrical transient which comprises a galvanometer arranged to furnish a laterally oscillating narrow beam of light, a fixed frequency oscillator driving said galvanometer, a modulator circuit connecting said oscillator to said galvanometer and adapted to modulate the amplitude of the oscillator output in proportion to an electrical transient impressed on said modulator, a light barrier placed in the path of said light beam, said barrier having an aperture whose width is less than the total sweep of the light beam, the entire aperture being arranged within the area covered by said light beam, and means for moving a photographic medium at a predetermined rate past the aperture beyond the light barrier, the direction of motion of the photographic medium being essentially at right angles to the direction of motion of the light beam.

2. An optical system for making an optical record of an electrical transient which comprises a reflecting mirror galvanometer, a light source arranged to direct a narrow beam of light to the reflecting mirror of said galvanometer, a fixed frequency oscillator feeding said galvanometer, a modulator circuit connecting said oscillator to said galvanometer and adapted to modulate the amplitude of the oscillator output in proportion to an electrical transient impressed on said modulator, a light barrier placed in the path of the light beam reflected from said mirror, said barrier having an aperture whose width is less than the total sweep of the light beam, the entire aperture being arranged within the area covered by said light beam, a lens beyond said light barrier and aligned with the aperture to condense the beam passing through the barrier into a line image, and means for moving a photographic medium at a predetermined rate of speed past the line image in the plane of focus of said lens, the direction of motion of the photographic medium being essentially at right angles to the direction of motion of the light beam.

3. An optical system for making optical records of a plurality of simultaneous electrical transients in side-by-side relation which comprises an array of galvanometers arranged essentially in line, each of said galvanometers being adapted to furnish a laterally oscillating narrow beam of light, a source of fixed frequency oscillations driving each of said galvanometers, a plurality of modulator circuits each connecting one of said galvanometers to said source of oscillations and adapted to modulate the amplitude of said oscillations in proportion to the electrical transients impressed on said modulators, a light barrier placed in the paths of said light beams, said barrier having a plurality of apertures, each aperture having a width less than the total sweep of the light beam with which it is associated, each aperture being arranged within the area covered by its light beam, a plurality of channel shields extending from said light barrier toward said galvanometers and defining separate light channels, each terminating at one of said apertures, said shields being of sufficient length to prevent light from a particular galvanometer from reaching more than one aperture, and means for moving a photographic medium at a predetermined rate past the apertures beyond the light barrier, the direction of motion of the photographic medium being essentially at right angles to the direction of motion of the light beams.

References Cited in the file of this patent

UNITED STATES PATENTS

| | | |
|---|---|---|
| 1,913,200 | Hathaway | June 6, 1933 |
| 1,969,143 | Metcalf | Aug. 7, 1934 |
| 1,999,951 | Whitman | Apr. 30, 1935 |
| 2,147,623 | Wender | Feb. 14, 1939 |
| 2,343,182 | Herrnfeld | Feb. 29, 1944 |
| 2,499,593 | Kreuzer et al. | Mar. 7, 1950 |
| 2,645,552 | Stevinson | July 14, 1953 |